United States Patent
Antony et al.

(10) Patent No.: US 11,444,805 B2
(45) Date of Patent: Sep. 13, 2022

(54) SECURE OVER THE AIR UPLOAD MECHANISM FOR WIRELESS MESH NODES

(71) Applicant: WiSilica Inc., Laguna Hills, CA (US)

(72) Inventors: Francis Antony, Aluva (IN); Suresh Singamsetty, Aliso Viejo, CA (US); Dennis Ching Chung Kwan, San Diego, CA (US); Manu Velayudhan, Ernakulam (IN)

(73) Assignee: WISILICA INC., Laguna Hills, CA (US)

( * ) Notice: Subject to any disclaimer, the term of this patent is extended or adjusted under 35 U.S.C. 154(b) by 0 days.

(21) Appl. No.: 16/532,734

(22) Filed: Aug. 6, 2019

(65) Prior Publication Data

US 2021/0044455 A1 Feb. 11, 2021

(51) Int. Cl.
*H04L 12/46* (2006.01)
*H04L 1/18* (2006.01)
*H04L 9/06* (2006.01)
*G06F 8/65* (2018.01)
*H04W 84/18* (2009.01)

(52) U.S. Cl.
CPC .......... *H04L 12/4625* (2013.01); *H04L 1/189* (2013.01); *H04L 9/0643* (2013.01); *G06F 8/65* (2013.01); *H04W 84/18* (2013.01)

(58) Field of Classification Search
CPC ... H04L 12/4625; H04L 1/189; H04L 9/0643; G06F 8/65; H04W 84/18
USPC ....................................................... 370/315
See application file for complete search history.

(56) References Cited

U.S. PATENT DOCUMENTS

| | | | | |
|---|---|---|---|---|
| 5,553,083 A | * | 9/1996 | Miller | H04L 47/115 714/748 |
| 2008/0075009 A1 | * | 3/2008 | Picard | H04L 45/127 370/238 |
| 2008/0219204 A1 | * | 9/2008 | Lee | H04L 1/1812 370/315 |
| 2013/0128726 A1 | * | 5/2013 | Hellhake | H04W 40/38 370/225 |
| 2013/0208627 A1 | * | 8/2013 | Picard | G01D 4/006 370/255 |
| 2015/0249595 A1 | * | 9/2015 | Geiger | H04L 45/24 370/392 |

* cited by examiner

*Primary Examiner* — Kibrom T Hailu
*Assistant Examiner* — Nizam U Ahmed
(74) *Attorney, Agent, or Firm* — Rowan TELS LLC (57) ABSTRACT

A method of transmitting a block from a bridge to a mesh network includes transmitting the block to at least a first node of a plurality of nodes, for distribution through the mesh network. The block includes a plurality of packets. The bridge receives, from the plurality of nodes, a plurality of status packets. Each status packet indicates reception status of the plurality of packets at a respective node of the plurality of nodes. The bridge selects at least a first packet of the plurality of packets for retransmission to the mesh network, based on the status packets. The bridge generates a retransmission block including at least the first packet. The first packet is included in the retransmission block a number of times based on the status packets. The bridge transmits the retransmission block to at least the first node, for distribution of the retransmission block through the mesh network.

20 Claims, 7 Drawing Sheets

(PRIOR ART)

SECURE OVER THE AIR UPLOAD MECHANISM FOR WIRELESS MESH NODES

BACKGROUND

When data is communicated to nodes of a mesh network, not all of the data may be successfully received at each and every node of the mesh network. For example, when the data is communicated in the form of data packets, not every data packet may be successfully received at each and every node of the mesh network. As a further example, a particular data packet may be successfully received at a first node of the mesh network, but may not be successfully received at a second node of the mesh network.

To increase the number of data packets successfully received at each of the nodes, particular data packets may be retransmitted to the mesh network.

BRIEF SUMMARY

According to at least one embodiment, a method of transmitting a block from a bridge to a mesh network includes transmitting, by the bridge, the block to at least a first node of a plurality of nodes of the mesh network, for distribution through the mesh network, the block including a plurality of packets. The bridge receives, from the plurality of nodes, a plurality of status packets. Each of the plurality of status packets indicates reception status of the plurality of packets at a respective node of the plurality of nodes. The bridge selects at least a first packet of the plurality of packets for retransmission to the mesh network, based on the plurality of status packets. The bridge generates a retransmission block including at least the first packet of the plurality of packets. The first packet is included in the retransmission block a number of times based on the plurality of status packets. The bridge transmits the retransmission block to at least the first node of the plurality of nodes, for distribution of the retransmission block through the mesh network.

According to at least another embodiment, a computing apparatus includes a processor and a memory storing instructions. When executed by the processor, the instructions configure the apparatus to transmit a block to at least a first node of a plurality of nodes of a mesh network, for distribution through the mesh network. The block includes a plurality of packets. The instructions configure the apparatus to receive, from the plurality of nodes, a plurality of status packets, wherein each of the plurality of status packets indicates reception status of the plurality of packets at a respective node of the plurality of nodes. The instructions configure the apparatus to select at least a first packet of the plurality of packets for retransmission to the mesh network, based on the plurality of status packets. The instructions configure the apparatus to generate a retransmission block including at least the first packet of the plurality of packets. The first packet is included in the retransmission block a number of times based on the plurality of status packets. The instructions configure the apparatus to transmit the retransmission block to at least the first node of the plurality of nodes, for distribution of the retransmission block through the mesh network.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

A mesh network is a type of machine communication system in which each client node (sender and receiver of data messages) of the network also relays data for the network. All client nodes cooperate in the distribution of data in the network. Mesh networks may in some cases also include designated router and gateway nodes (e.g., nodes that connect to an external network such as the Internet) that are or are not also client nodes. The nodes are often laptops, cell phones, or other wireless devices. The coverage area of the nodes working together as a mesh network is sometimes called a mesh cloud.

Mesh networks can relay messages using either a flooding technique or a routing technique. Flooding is a routing algorithm in which every incoming packet, unless addressed to the receiving node itself, is forwarded through every outgoing link of the receiving node, except the one it arrived on. With routing, the message is propagated through the network by hopping from node to node until it reaches its destination. To ensure that all its paths remain available, a mesh network may allow for continuous connections and may reconfigure itself around broken paths. In mesh networks there is often more than one path between a source and a destination node in the network. A mobile ad hoc network (MANET) is usually a type of mesh network. MANETs also allow the client nodes to be mobile.

A wireless mesh network (WMN) is a mesh network of radio nodes. Wireless mesh networks can self-form and self-heal and can be implemented with various wireless technologies and need not be restricted to any one technology or protocol. Each device in a mobile wireless mesh network is free to move, and will therefore change its routing links among the mesh nodes accordingly.

Mesh networks may be decentralized (with no central server) or centrally managed (with a central server). Both types may be reliable and resilient, as each node needs only transmit as far as the next node. Nodes act as routers to transmit data from nearby nodes to peers that are too far away to reach in a single hop, resulting in a network that can span larger distances. The topology of a mesh network is also reliable, as each node is connected to several other nodes. If one node drops out of the network, due to hardware failure or moving out of wireless range, its neighbors can quickly identify alternate routes using a routing protocol.

Figure 1:
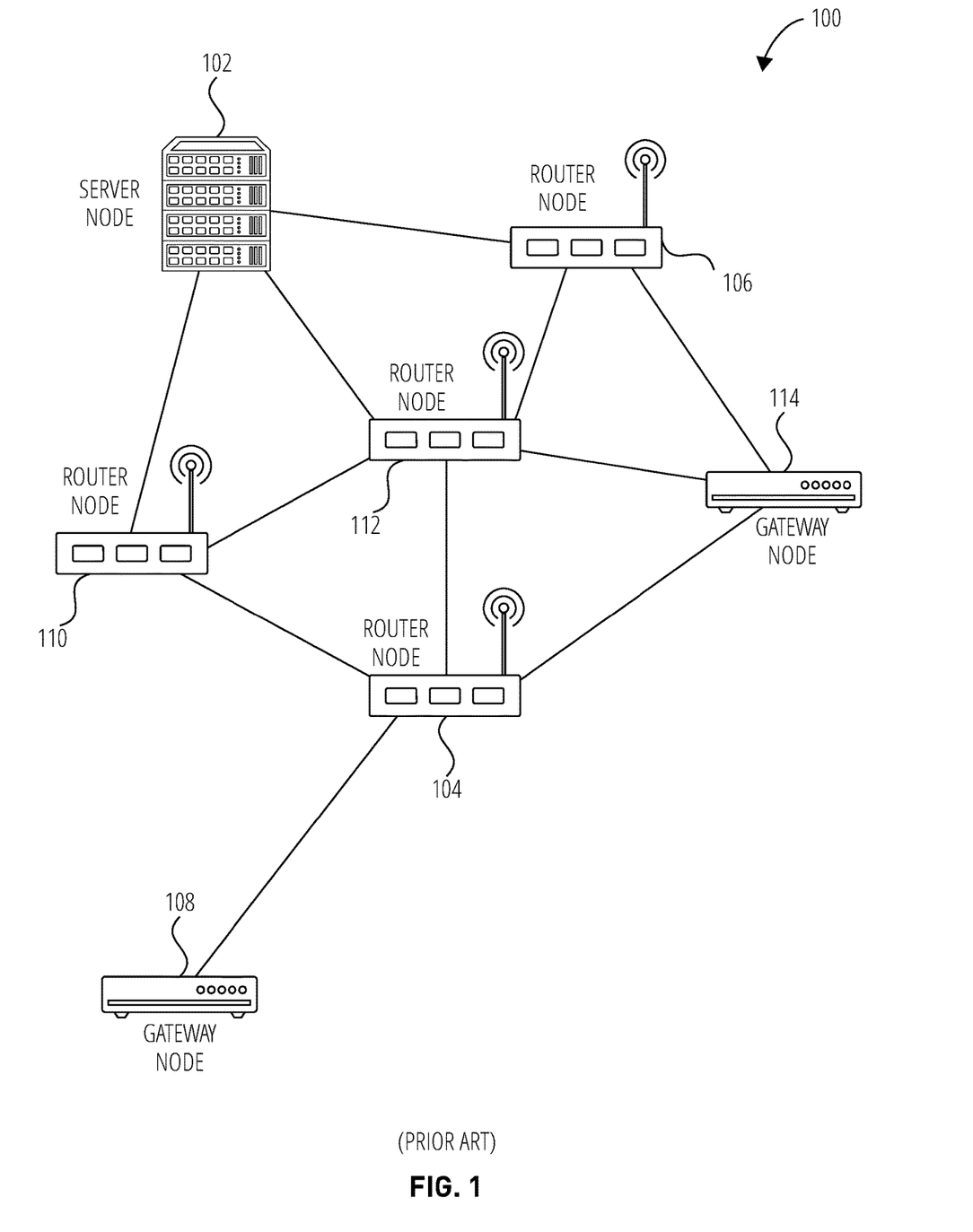
FIG. 1 illustrates a wireless mobile mesh network.

Referring to FIG. 1, an exemplary wireless mobile mesh network 100 includes a server node 102, a router node 110, a router node 112, a router node 106, a router node 104, a gateway node 114, and a gateway node 108. The server node 102, the gateway node 114, and the gateway node 108 also operate as router nodes. Every node in the network participates in the routing of communications in the wireless mobile mesh network 100. The gateway node 114 and gateway node 108 provide an interface between the wireless mobile mesh network 100 and an external network, such as the Internet or a local area network. The server node 102 provides some level of centralized management for the wireless mobile mesh network 100, and may be optional if each node acts autonomously to self-manage. One or more of the nodes may be fixed in location, some of the nodes may be mobile, or all of the nodes may be mobile.

In some conventional mesh networks, control and management is implemented utilizing remote transmitters (e.g., beacons) that emit an identifier to compatible receiving devices (mesh nodes), triggering delivery of a targeted push notification. These transmitters operate as part of a targeted notification system that includes a database of identifiers for each transmitter and targeted notifications. The emitted identifiers are unique to each transmitter, allowing the notification system to determine the location of the receiving device based on the location of the transmitter.

Conventional transmitters do not communicate with an administrator to minimize power consumption. As a result, the transmitters do not provide status information or alert administrators when mesh node battery levels are low. Conventional transmitters emit static identifiers. These identifiers are susceptible to spoofing. A solution is needed to minimize power consumption on battery powered mesh node devices and reduce susceptibility to spoofing of transmitters while permitting communication between the transmitters and an administrator.

Embodiments of the disclosure will be described in more detail with respect to a firmware update that is communicated to nodes of a mesh network (e.g., wireless mobile mesh network 100). However, it is understood that features described herein with reference to various embodiments may be applicable to communication of other types (e.g., software updates, data of one or more assorted types, etc.)

Figure 2:
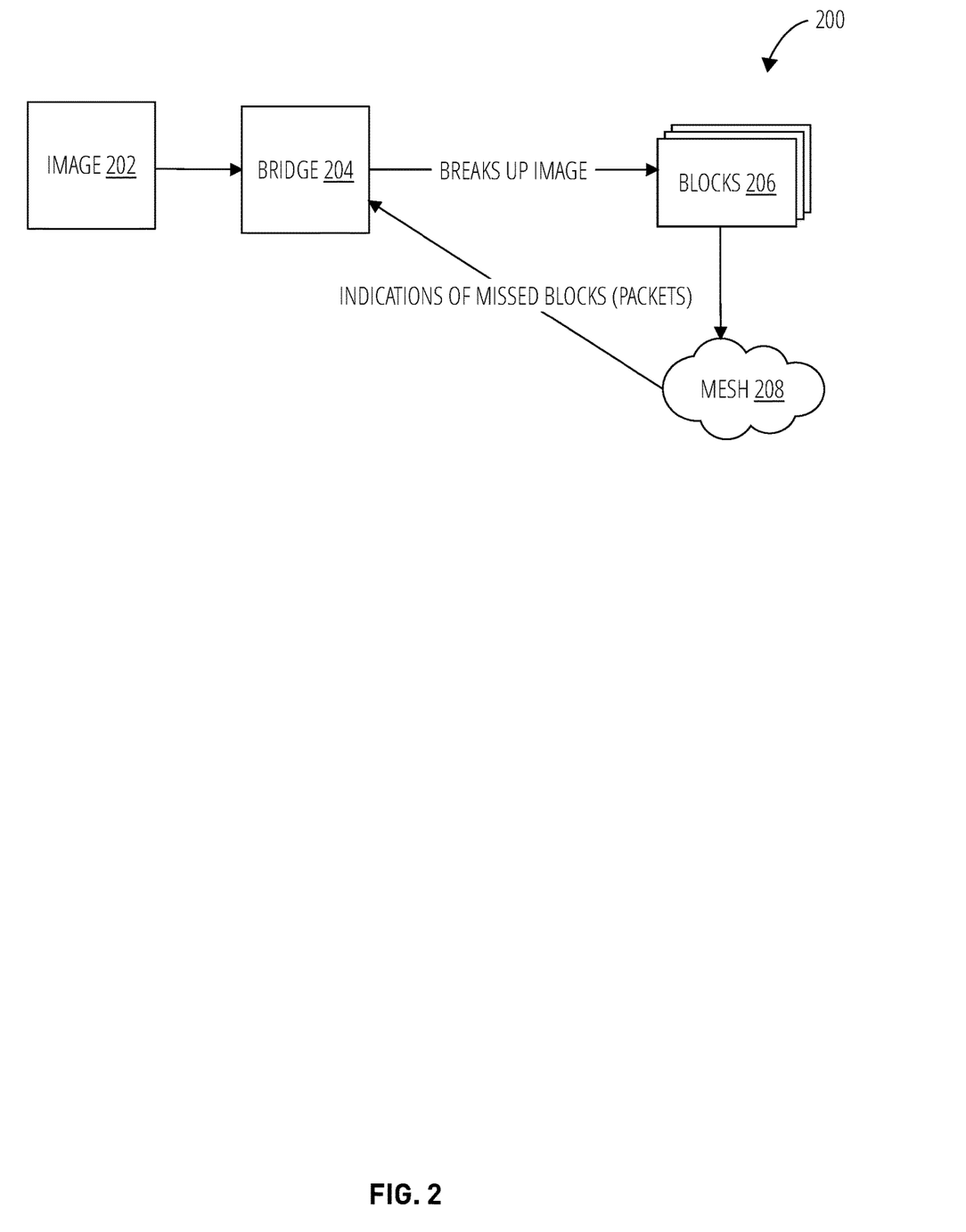
FIG. 2 is a block diagram illustrating an example of communicating a firmware update according to at least one embodiment.

FIG. 2 is a block diagram 200 illustrating an example of communicating a firmware update according to at least one embodiment. The firmware update is broadcast over the air (OTA). Broadcast OTA is an example of a reliable and secure mechanism to communicate information to multiple devices at the same time.

With reference to FIG. 2, an image 202 of the firmware update is provided to a server (e.g., bridge 204). The bridge 204 divides (e.g., fragments) the image 202 into smaller entities (e.g., blocks 206) that may be individually transmitted to a mesh 208 (e.g., wireless mobile mesh network 100). For example, each of the blocks 206 may be separately transmitted to the mesh 208. According to a particular embodiment, the blocks 206 are of an equal size (e.g., a predetermined size).

For example, each of the blocks 206 may be formed of a particular number of packets. By way of illustration, each of the blocks 206 may be formed of 64 packets, each of which is 8 bytes in length. Accordingly, each of the blocks 206 is 512 bytes in length.

Figure 3:
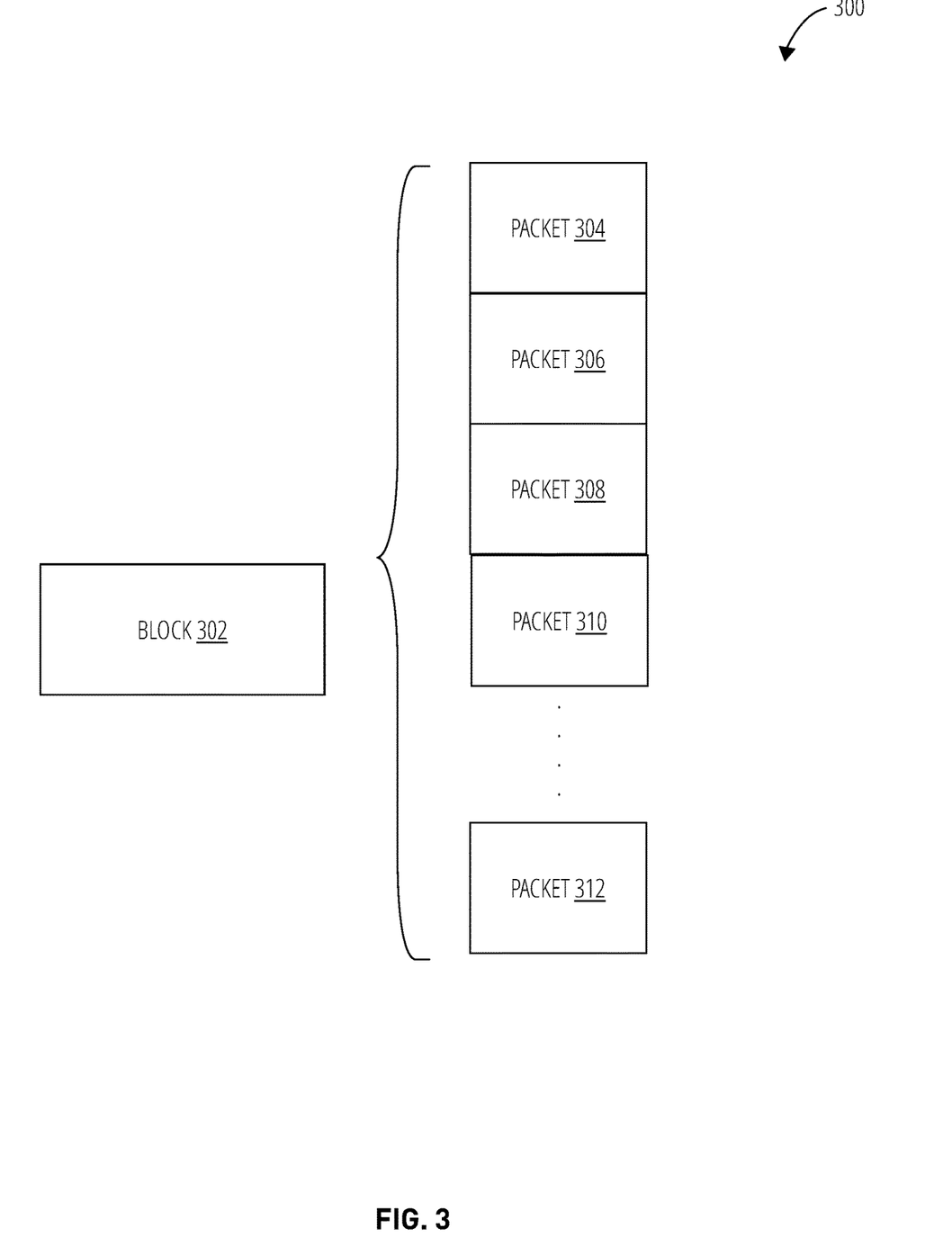
FIG. 3 is a block diagram illustrating an example of contents of one of the blocks according to at least one embodiment.

FIG. 3 is a block diagram 300 illustrating an example of contents of one of the blocks 206. With reference to FIG. 3, a block 302 is divided (e.g., fragmented) into a particular number of packets. The packets include packet 304, packet 306, packet 308, packet 310 and packet 312. For example, the packet 304 may correspond to one end of the block 302 (e.g., a most significant end), and the packet 312 may correspond to an opposite end of the block 302 (e.g., a least significant end).

Each of the packets may be sent to a mesh network (e.g., wireless mobile mesh network 100). For example, each packet may be sent to a gateway node (e.g., gateway node 108) such that the packet can be relayed by the nodes of the mesh network.

According to at least one embodiment, the packets may include a first packet that includes contents indicating that the packet corresponds to a start of the block. For example, the packet 304 may include contents indicating that the packet 304 is a start of the block 302. As a further example, the packet 304 may include data identifying a version of the firmware, data indicating a total number of blocks and or a total number of packets in the firmware image, and data indicating a block identifier (e.g., an ID uniquely identifying the block 302). Such contents sufficiently enable a recipient (e.g., nodes of the wireless mobile mesh network 100) to identify the packet 304 as a start of the block 302.

Intermediate packets are packets that are between the first packet and a last packet of a particular block (e.g., block 302). The intermediate packets may carry firmware data. In addition to firmware data, the intermediate packets may further include identification data. For example, with continued reference to FIG. 3, the intermediate packets includes the packet 306, the packet 308, and the packet 310. In addition to firmware data, the packet 306, the packet 308, and the packet 310 may each further include a block identifier (e.g., an ID uniquely identifying the block 302) and a packet identifier (e.g., an ID uniquely identifying the packet).

The packets of the block (e.g., block 302) may include a last packet that includes contents indicating that the packet corresponds to an end of the block. For example, the packet 312 may include contents indicating that the packet 312 is an end of the block 302. As a further example, the packet may include data indicating a block identifier (e.g., an ID uniquely identifying the block 302), an error-detecting code for the block (e.g., a cyclic redundancy check (CRC) code for the block 302), and data identifying the version of the firmware. Such contents sufficiently enable a recipient (e.g., nodes of the wireless mobile mesh network 100) to identify the packet 312 as an end of the block 302.

Not every data packet may be successfully received at each and every node of the mesh network. For example, the packets of the block 302 may be transmitted to the nodes of the mesh network (e.g., wireless mobile mesh network 100). However, at a particular one of the nodes, one or more packets of the block 302 may be missed. For example, if the packet identifiers in the intermediate packets are sequential IDs (e.g., consecutive IDs), the particular node is able to recognize which, if any, packets were not successfully received. For a particular block, the particular node may maintain a record of which packets were successfully received (e.g., a record of the packet IDs of packets which were successfully received) and/or a record of which packets were unsuccessfully received (e.g., a record of the packet IDs of packets which were unsuccessfully received).

For example, a particular data packet (e.g., packet 308) may be successfully received at a first node (e.g., router node 110) of the mesh network, but may be not successfully received at a second node (e.g., router node 112) of the mesh network. In this situation, it may be desirable for the second node to provide information (e.g., to the bridge 204) indicating that a packet corresponding to packet 308 was not successfully received.

In situations involving a broadcast transmission, providing feedback regarding individual packets may not be optimal. For example, if all nodes in the mesh network provide feedback indicating whether a particular packet was (or was not) received, a significant amount of feedback data may be flooded into the mesh network.

Various embodiments are directed to reducing the amount of feedback data that is introduced into the mesh network. For example—according to at least one embodiment, upon reception of an end of a block (e.g., packet 312 of block 302), at least one node of the mesh network provides feedback indicating (or identifying) all packets of the block that were unsuccessfully received at the node and/or all packets of the block that were successfully received at the node.

For example, according to at least one embodiment, a node (e.g., router node 110, router node 112, etc.) prepares a status packet including feedback status regarding packets of a particular block (e.g., block 302). A status packet contains 8 bytes for data and there is additional space for metadata. The status packet may include data indicating the block identifier. The status packet may further include a string of bitwise status indicators, each of which corresponds to a respective packet in the block. For example, if the block is formed by 64 packets, then the packet may include a string of 64 bitwise indicators. Each of the indicators indicates whether a corresponding packet in the block was received or not received. Such contents sufficiently enable a recipient (e.g., bridge 204) to conclude which packets were received at the node and which packets were not received at the node.

According to at least one embodiment, each node in the mesh network prepares such a packet for delivery to the recipient. Accordingly, the recipient is informed which packets were missed, and by which devices. As such, with regards to a particular packet of the block (e.g., block 302), the recipient is able to determine how many instances the particular packet was missed (e.g., how many nodes failed to receive the particular packet). For example, if only one node reported that the particular packet was missed, then the recipient concludes that the particular packet was missed only in one instance. If only two nodes reported that the particular packet was missed, then the recipient concludes that the particular packet was missed only in two instances.

As will be described in more detail below with reference to various embodiments, the recipient (e.g., bridge 204) accordingly retransmits one or more packets of the block to the mesh network (e.g., wireless mobile mesh network 100) based on the information received from the nodes of the mesh network. For example, the bridge 204 selects one or more packets for retransmission, based on the number of instances each packet in the block (e.g., block 302) was missed by the nodes of the mesh network. According to at least one particular embodiment, the bridge 204 selects one or more packets for retransmission, based on an identified pattern by which particular packets were missed by the nodes of the mesh network. Alternatively (or in addition), the bridge 204 selects one or more packets for retransmission, based on the number of instances in which the packets were not received (e.g., the number of nodes that failed to receive a particular packet). Accordingly, particular packets may be prioritized for retransmission based on how many different nodes failed to receive the packets. As will be described in more detail below, a particular packet may be effectively retransmitted one or more times based on considerations that have been described. For example, a particular packet may be duplicated in a retransmission block one or more times, based on how many different nodes failed to receive the packets.

According to at least one embodiment, the bridge 204 identifies a pattern according to which particular packets are missed by the nodes of the mesh network. For example, based on the information received from the nodes, the bridge 204 may determine that, at a significant number of nodes, every fifth packet (e.g., the 5th sequential packet, the 10th sequential packet, the 15th sequential packet, etc. of the block 302) is often missed. Based on the pattern identified, the bridge 204 may duplicate the missed packets in a retransmission block a particular number of times. For example, if every fifth packet is being missed by the nodes approximately 30% more often in relation to other packets in the block, then two copies of every fifth packet may be inserted in a retransmission block. As another example, if every fifth packet is being missed by the nodes approximately 50% more often in relation to other packets in the block, then three copies of every fifth packet may be inserted in a retransmission block.

A sequence in which the packets are inserted in the retransmission block may correspond to (or follow) a sequence in which the packets were missed. For example, the 5th sequential packet may be inserted in the retransmission block at a location preceding the 10th sequential block, which, in turn, may be inserted in the retransmission block at a location preceding the 15th sequential block, etc.

Alternatively, if a pattern is identified with respect to packets that are missed, packets selected for retransmission may be inserted in the retransmission block at one or more random locations. Accordingly, a probability that the nodes will miss the retransmitted packets may be decreased.

According to at least one embodiment, the bridge 204 selects one or more packets for retransmission, based on the number of instances in which the packets were not received (e.g., the number of nodes that failed to receive a particular packet). For example, if a particular packet (e.g., packet 306) is missed by the nodes approximately 30% more often in relation to other packets in the block, then two copies of the particular packet may be inserted in a retransmission block. As another example, if the particular packet (e.g., packet 308) is missed by the nodes approximately 50% more often in relation to other packets in the block, then three copies of the particular packet may be inserted in a retransmission block.

Figure 4:
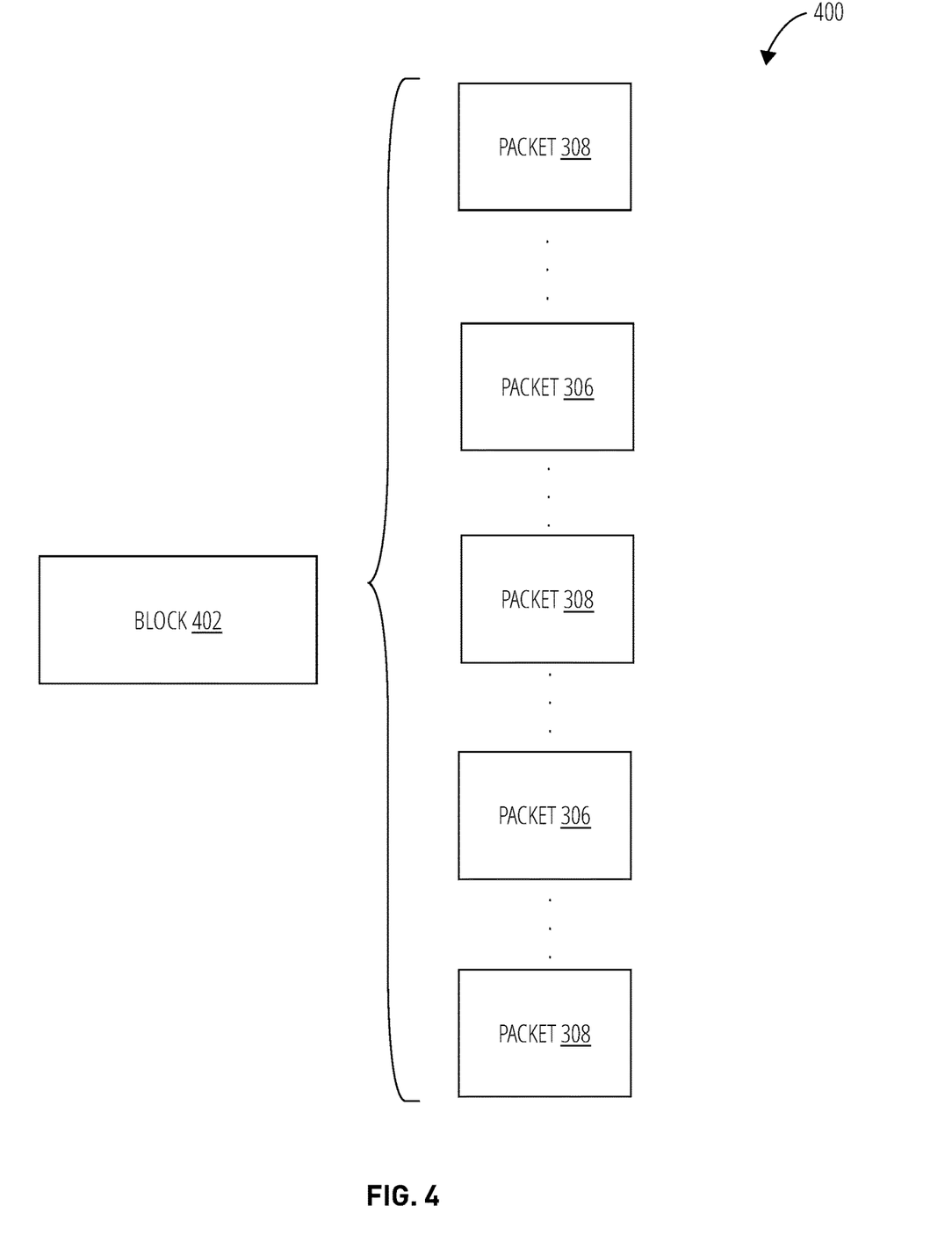
FIG. 4 is a block diagram illustrating an example of contents of a retransmission block according to at least one embodiment.

FIG. 4 is a block diagram 400 illustrating an example of contents of a retransmission block 402. In the example of FIG. 4, packet 306 is missed by the nodes of the mesh network (e.g., wireless mobile mesh network 100) approximately 30% more often in relation to other packets in the block (e.g., block 302). Accordingly, two copies of packet 306 are inserted in the retransmission block 402. Also in the example of FIG. 4, packet 308 is missed by the nodes approximately 50% more often in relation to other packets in the block. Accordingly, three copies of packet 308 are inserted in the retransmission block 402.

Unlike other blocks (e.g., blocks 206, block 302), the retransmission block 402 may not have a predetermined length. Rather, the retransmission block 402 may have a length that is variable depending on the number of packets that the retransmission block 402 carries. As illustrated in the example of FIG. 4, copies of a particular packet (e.g., packet 306) may be interleaved with copies of another particular packet (e.g., packet 308).

According to embodiments described, the retransmission block (e.g., retransmission block 402) is transmitted to the mesh network (e.g., wireless mobile mesh network 100). When the retransmission block is received at a particular node, the node may select and store one or more packets that were previously unsuccessfully received.

Once a node has received (e.g., successfully received) all blocks (e.g., all of blocks 206) for a particular update, the node may send a request for a hash value to a server (e.g., bridge 204). In response, the server may provide the node with a hash of an image (e.g., image 202) encrypted with device key. The node may then validate the hash and accept the image. Accordingly, the node may install the particular update. This provides an additional level of security for updates (e.g., firmware updates, software updates) that are broadcast over-the-air.

Figure 5:
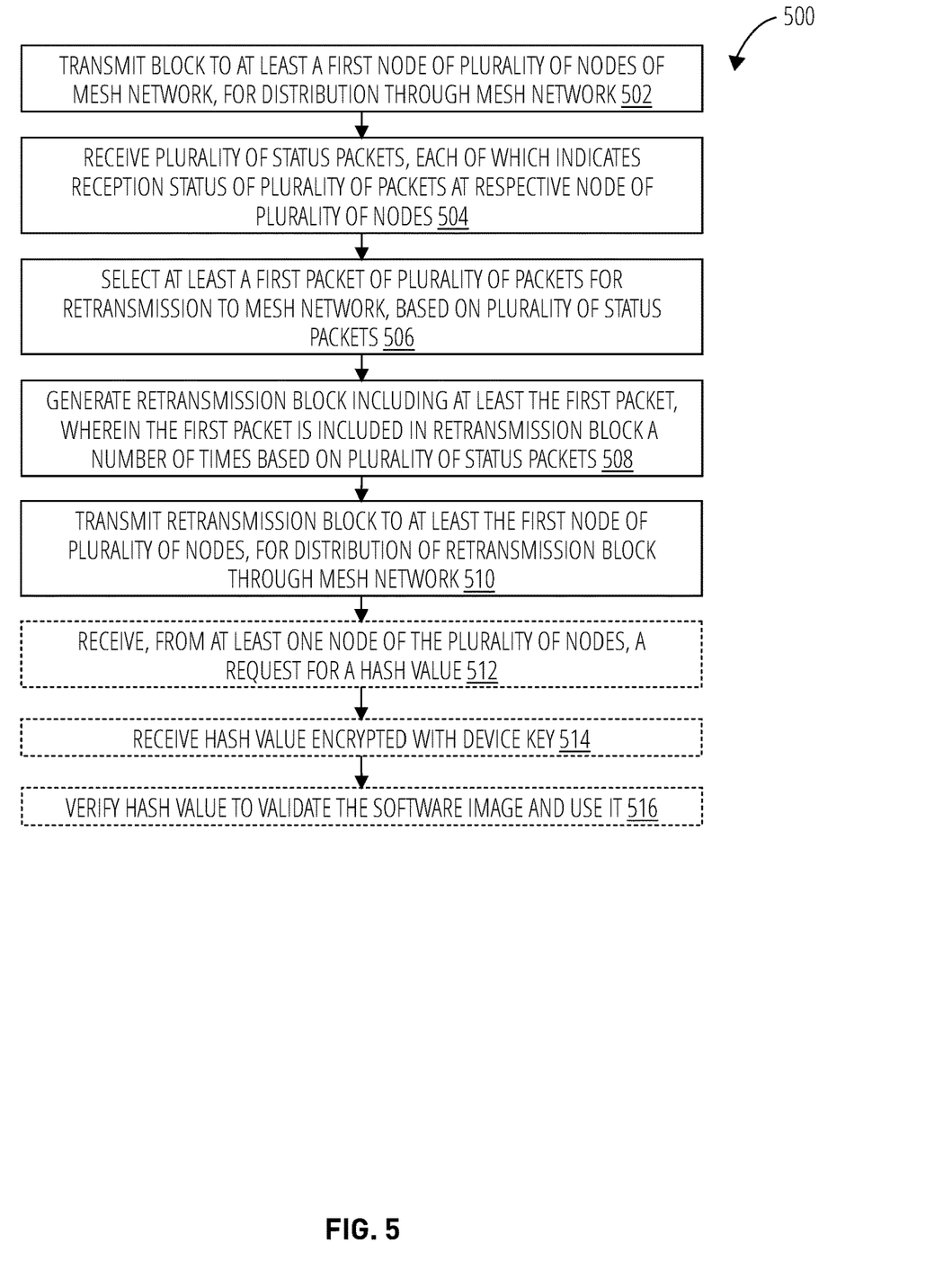
FIG. 5 is a flowchart of a method of transmitting a block from a bridge to a mesh network, in accordance with at least one embodiment.

FIG. 5 is a flowchart of a method 500 of transmitting a block from a bridge to a mesh network, in accordance with at least one embodiment.

At block 502, the bridge transmits the block to at least a first node of a plurality of nodes of the mesh network, for distribution through the mesh network. The block includes a plurality of packets. For example, the bridge 204 transmits block 302 to gateway node 108 of the wireless mobile mesh network 100, for distribution through the network. The block 302 includes packet 304, packet 306, packet 308, packet 310, and packet 312.

At block 504, the bridge receives, from the plurality of nodes, a plurality of status packets. Each of the plurality of status packets indicates reception status of the plurality of packets at a respective node of the plurality of nodes. For example, the bridge 204 receives, from the nodes of the wireless mobile mesh network 100, a plurality of status packets. A particular status packet indicates reception status of the packets of the block 302 at a particular node (e.g., router node 110).

At block 506, the bridge selects at least a first packet of the plurality of packets for retransmission to the mesh network, based on the plurality of status packets. For example, the bridge 204 selects packet 306 for retransmission to the wireless mobile mesh network 100, based on the plurality of status packets.

At block 508, the bridge generates a retransmission block including at least the first packet of the plurality of packets. The first packet is included in the retransmission block a number of times based on the plurality of status packets. For example, the bridge 204 generates retransmission block 402 including the packet 306. The packet 306 is included in the retransmission block 402 a number of times based on the plurality of status packets.

At block 510, the bridge transmits the retransmission block to at least the first node of the plurality of nodes, for distribution of the retransmission block through the mesh network. For example, the bridge 204 transmits the retransmission block 402 to gateway node 108, for distribution of the retransmission block 402 through the wireless mobile mesh network 100.

At block 512, the bridge may receive a request for a hash value from at least one node of the plurality of nodes. At block 514, the hash value is received with device key. At block 516, the hash value is verified to validate the software image and use it.

Figure 6:
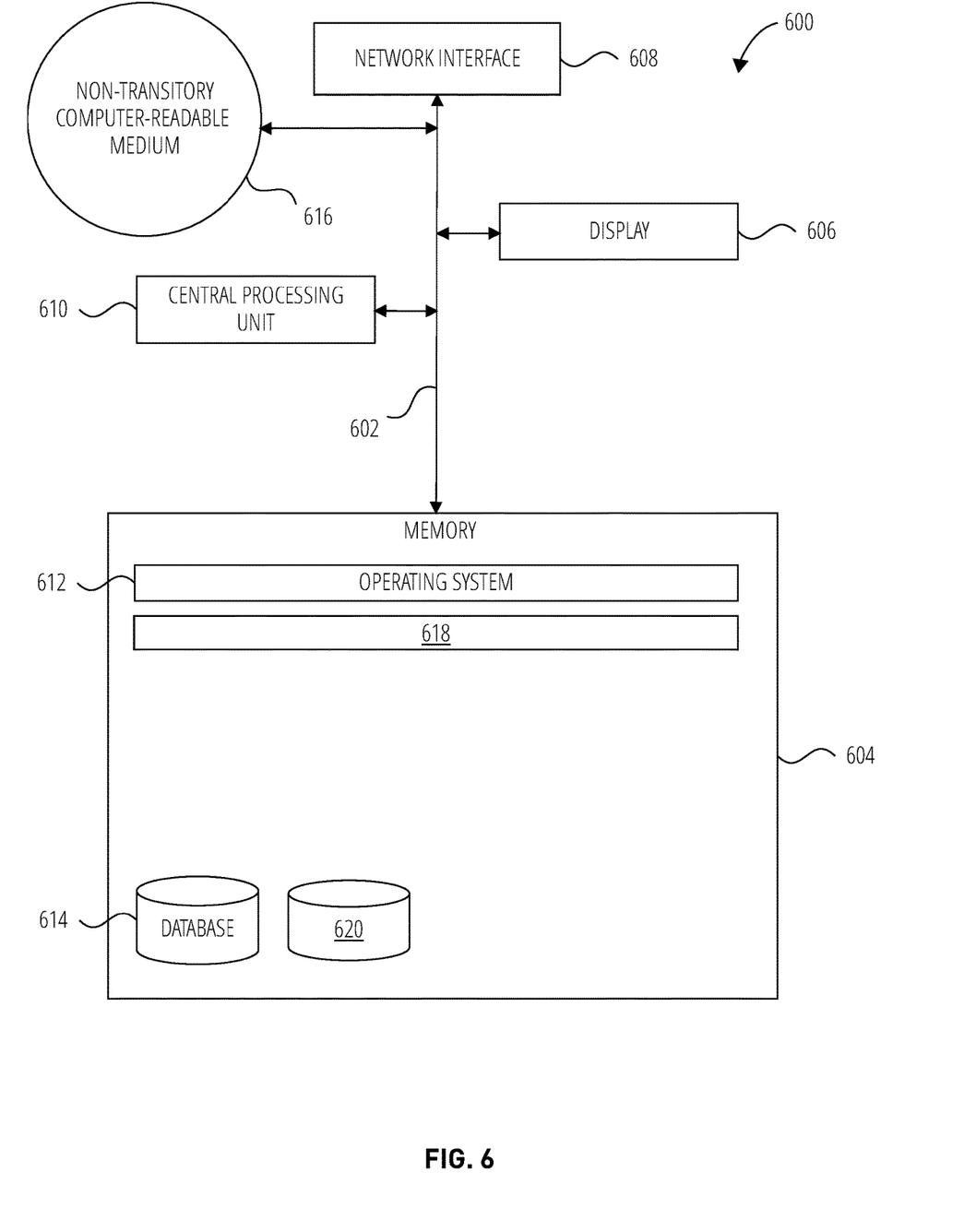
FIG. 6 illustrates a system in accordance with one embodiment.

FIG. 6 illustrates several components of an exemplary system 600 in accordance with one embodiment. In various embodiments, system 600 may include a desktop PC, server, workstation, mobile phone, laptop, tablet, set-top box, appliance, or other computing device that is capable of performing operations such as those described herein. In some embodiments, system 600 may include many more components than those shown in FIG. 6. However, it is not necessary that all of these generally conventional components be shown in order to disclose an illustrative embodiment. Collectively, the various tangible components or a subset of the tangible components may be referred to herein as "logic" configured or adapted in a particular way, for example as logic configured or adapted with particular software or firmware.

In various embodiments, system 600 may comprise one or more physical and/or logical devices that collectively provide the functionalities described herein. In some embodiments, system 600 may comprise one or more replicated and/or distributed physical or logical devices.

In some embodiments, system 600 may comprise one or more computing resources provisioned from a "cloud computing" provider, for example, Amazon Elastic Compute Cloud ("Amazon EC2"), provided by Amazon.com, Inc. of Seattle, Wash.; Sun Cloud Compute Utility, provided by Sun Microsystems, Inc. of Santa Clara, Calif.; Windows Azure, provided by Microsoft Corporation of Redmond, Wash., and the like.

System 600 includes a bus 604 interconnecting several components including a network interface 610, a display 608, a central processing unit 612, and a memory 606.

Memory 606 generally comprises a random access memory ("RAM") and permanent non-transitory mass storage device, such as a hard disk drive or solid-state drive. Memory 606 stores an operating system 614 and a process for block transmission 602.

These and other software components may be loaded into memory 606 of system 600 using a drive mechanism (not shown) associated with a non-transitory computer-readable medium 618, such as a floppy disc, tape, DVD/CD-ROM drive, memory card, or the like.

Memory 606 also includes database 616 and a firmware update database 620. In some embodiments, system 600 may communicate with database 616 and the firmware update database 620 via network interface 610, a storage area network ("SAN"), a high-speed serial bus, and/or via the other suitable communication technology.

In some embodiments, database 616 may comprise one or more storage resources provisioned from a "cloud storage" provider, for example, Amazon Simple Storage Service ("Amazon S3"), provided by Amazon.com, Inc. of Seattle, Wash., Google Cloud Storage, provided by Google, Inc. of Mountain View, Calif., and the like.

Figure 7:
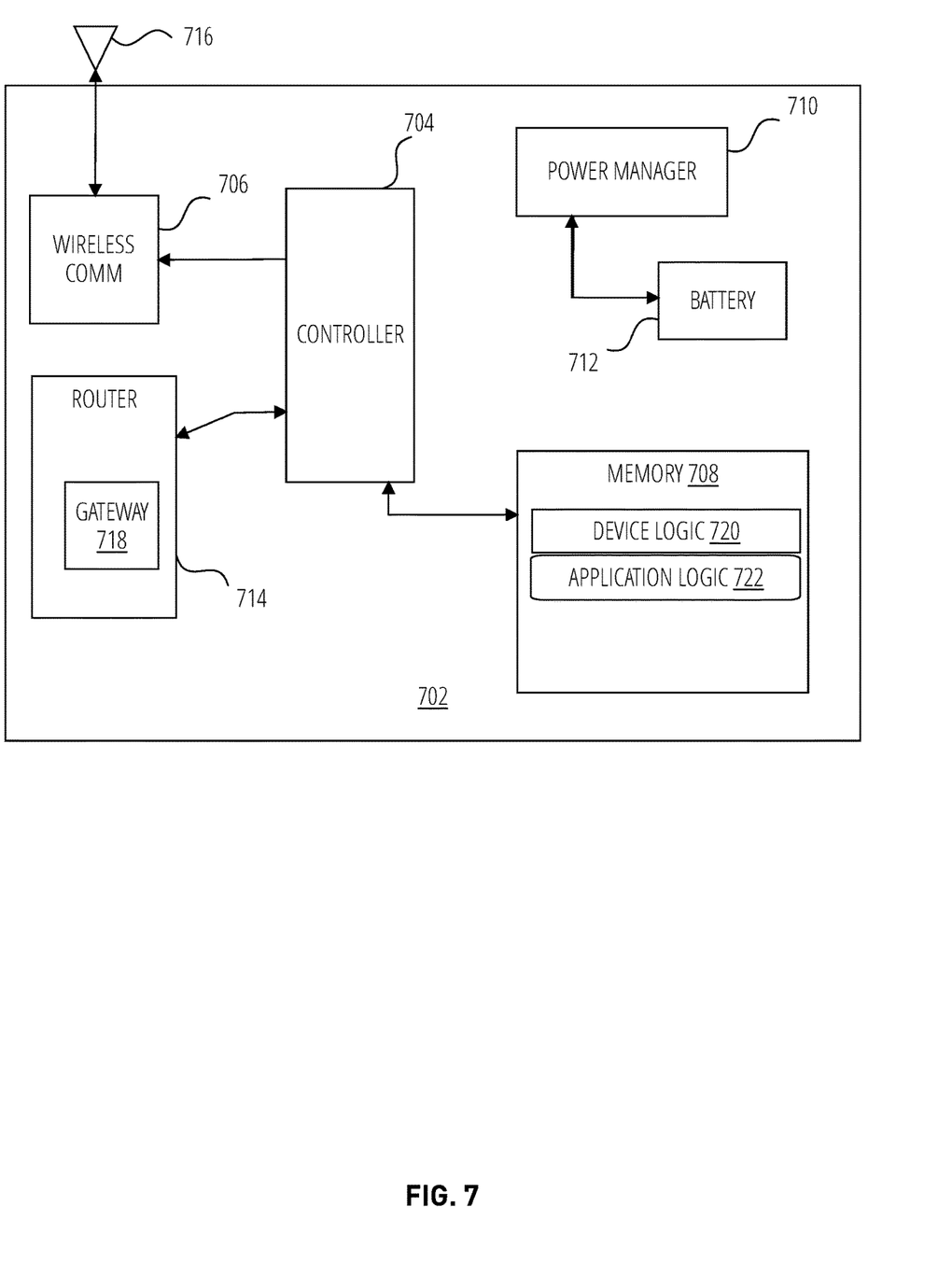
FIG. 7 illustrates an embodiment of a mobile wireless node.

Referring to FIG. 7, a mobile wireless node 702 includes an antenna 716, a signal processing and system control 704, a wireless communication 706, a memory 708, a power manager 710, a battery 712, a router 714, a mobile wireless node 702, and a gateway 718.

The signal processing and system control 704 controls and coordinates the operation of other components as well as providing signal processing for the mobile wireless node 702. For example, the signal processing and system control 704 may extract baseband signals from radio frequency signals received from the wireless communication 706 logic, and process baseband signals up to radio frequency signals for communications transmitted to the wireless communication 706 logic. The signal processing and system control 704 may comprise a central processing unit, digital signal processor, one or more controllers, or combinations of these components.

The wireless communication 706 includes memory 708 which may be utilized by the signal processing and system control 704 to read and write instructions (commands) and data (operands for the instructions). The memory 708 may include device logic 722 and application logic 720.

The router 714 performs communication routing to and from other nodes of a mesh network (e.g., wireless mobile mesh network 100) in which the mobile wireless node 702 is utilized. The router 714 may optionally also implement a network gateway 718.

The components of the mobile wireless node 702 may operate on power received from a battery 712. The battery 712 capability and energy supply may be managed by a power manager 710.

The mobile wireless node 702 may transmit wireless signals of various types and range (e.g., cellular, Wi-Fi, Bluetooth, and near field communication i.e. NFC). The mobile wireless node 702 may also receive these types of wireless signals. Wireless signals are transmitted and received using wireless communication 706 logic coupled to one or more antenna 716. Other forms of electromagnetic radiation may be used to interact with proximate devices, such as infrared.

What is claimed is:

1. A method of transmitting a block from a bridge to a mesh network, the method comprising:
    transmitting, by the bridge, the block to at least a first node of a plurality of nodes of the mesh network, for distribution through the mesh network, the block comprising a plurality of packets, wherein the block is part of a firmware update or a software update;
    receiving, at the bridge from the plurality of nodes, a plurality of status packets, wherein each of the plurality of status packets indicates reception status of the plurality of packets at a respective node of the plurality of nodes;
    selecting, by the bridge, at least a first packet of the plurality of packets for retransmission to the mesh network, based on the plurality of status packets;
    generating, by the bridge, a retransmission block including at least the first packet of the plurality of packets, wherein the first packet is included in the retransmission block a number of times based on the plurality of status packets; and
    transmitting the retransmission block to at least the first node of the plurality of nodes, for distribution of the retransmission block through the mesh network.

2. The method of claim 1, where the first packet includes at least one of data identifying a version of a firmware, data indicating a total number of blocks, data indicating a total number of packets in a firmware image, and data indicating a block identifier.

3. The method of claim 1, wherein the firmware update or the software update is part of an over-the-air broadcast.

4. The method of claim 1, wherein each of the plurality of status packets includes a plurality of bitwise indicators, each of the plurality of bitwise indicators indicating whether a respective packet of the plurality of packets was received at the respective node.

5. The method of claim 1, wherein the first packet of the plurality of packets is selected based on a number of nodes of the plurality of nodes, at which the first packet was not received.

6. The method of claim 1, wherein the first packet of the plurality of packets is selected based on an identified pattern according to which particular packets were not received by the plurality of nodes.

7. The method of claim 6, wherein the first packet of the plurality of packets is included in the retransmission block according to a sequence that corresponds to a sequence in which packets including the first packet were not received.

8. The method of claim 6, wherein the first packet of the plurality of packets is included in the retransmission block at one or more random locations.

9. The method of claim 1, wherein the retransmission block has a length that is variable.

10. The method of claim 1, further comprising:
    receiving, from at least one node of the plurality of nodes, a request for a hash value, wherein the hash value is different for each node;
    receiving, by at least one node, the hash value encrypted with a device key; and
    verifying the hash value, wherein the hash value is verified by the at least one node receiving the hash value.

11. A computing apparatus, the computing apparatus comprising:
    a processor; and
    a memory storing instructions that, when executed by the processor, configure the apparatus to:
        transmit a block to at least a first node of a plurality of nodes of a mesh network, for distribution through the mesh network, the block comprising a plurality of packets, wherein the block is part of a firmware update or a software update;
        receive, from the plurality of nodes, a plurality of status packets, wherein each of the plurality of status packets indicates reception status of the plurality of packets at a respective node of the plurality of nodes;
        select at least a first packet of the plurality of packets for retransmission to the mesh network, based on the plurality of status packets;
        generate a retransmission block including at least the first packet of the plurality of packets, wherein the first packet is included in the retransmission block a number of times based on the plurality of status packets; and
        transmit the retransmission block to at least the first node of the plurality of nodes, for distribution of the retransmission block through the mesh network.

12. The computing apparatus of claim 11, where the first packet includes at least one of data identifying a version of a firmware, data indicating a total number of blocks, data indicating a total number of packets in a firmware image, and data indicating a block identifier.

13. The computing apparatus of claim 11, wherein the firmware update or the software update is part of an over-the-air broadcast.

14. The computing apparatus of claim 11, wherein each of the plurality of status packets includes a plurality of bitwise indicators, each of the plurality of bitwise indicators indicate whether a respective packet of the plurality of packets was received at the respective node.

15. The computing apparatus of claim 11, wherein the first packet of the plurality of packets is selected based on a number of nodes of the plurality of nodes, at which the first packet was not received.

16. The computing apparatus of claim 11, wherein the first packet of the plurality of packets is selected based on an identified pattern according to which particular packets were not received by the plurality of nodes.

17. The computing apparatus of claim 16, wherein the first packet of the plurality of packets is included in the retransmission block according to a sequence that corresponds to a sequence in which packets including the first packet were not received.

18. The computing apparatus of claim 16, wherein the first packet of the plurality of packets is included in the retransmission block at one or more random locations.

19. The computing apparatus of claim 11, wherein the retransmission block has a length that is variable.

20. The computing apparatus of claim 11, wherein the instructions further configure the apparatus to:
- receive, from at least one node of the plurality of nodes, a request for a hash value, wherein the hash value is different for each node;
- receive the hash value encrypted with a device key, wherein the hash value is different for each node; and
- verify the hash value, wherein the hash value is verified by the at least one node receiving the hash value.

* * * * *